United States Patent
Sayama et al.

(10) Patent No.: US 8,701,968 B2
(45) Date of Patent: Apr. 22, 2014

(54) FRICTION STIR WELDER AND METHOD FOR FRICTION STIR WELDING

(75) Inventors: Mitsuru Sayama, Saitama (JP); Tetsuya Miyahara, Saitama (JP); Fumiaki Fukuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1070 days.

(21) Appl. No.: 11/712,534

(22) Filed: Feb. 28, 2007

(65) Prior Publication Data

US 2007/0210140 A1    Sep. 13, 2007

(30) Foreign Application Priority Data

Mar. 9, 2006    (JP) .................. 2006-063836

(51) Int. Cl.
  *B23K 20/12*    (2006.01)
(52) U.S. Cl.
  USPC ........................................ 228/112.1; 228/2.1
(58) Field of Classification Search
  USPC .............................................. 228/112.1, 2.1
  See application file for complete search history.

(56) References Cited

U.S. PATENT DOCUMENTS

| | | | |
|---|---|---|---|
| 5,697,544 A * | 12/1997 | Wykes .......................... 228/2.1 |
| 6,051,325 A | 4/2000 | Talwar et al. |
| 7,290,695 B2 | 11/2007 | Koga et al. |
| 2002/0027155 A1* | 3/2002 | Okamura et al. .......... 228/112.1 |
| 2004/0238599 A1* | 12/2004 | Subramanian et al. ..... 228/112.1 |
| 2005/0040209 A1* | 2/2005 | Stotler et al. ................. 228/102 |

FOREIGN PATENT DOCUMENTS

JP    2004-074238    3/2004

* cited by examiner

*Primary Examiner* — Aaron Austin
*Assistant Examiner* — Megha Mehta
(74) *Attorney, Agent, or Firm* — Carrier Blackman & Associates, P.C.; Jospeh P. Carrier; Fulchand P. Shende

(57) ABSTRACT

The present invention provides a friction stir welder that includes a stage on which at least two material pieces to be welded are mounted and stacked, a pressing member that covers and presses end faces of the material pieces to be welded that are mounted and stacked on the stage, and a rotary tool that is inserted into the stacked material pieces to be welded while rotating, so that a plastic flow is generated at an interfacing portion as well as in the vicinity thereof between the rotary tool and the material pieces to be welded, thereby to joint the material pieces to be welded to each other.

13 Claims, 4 Drawing Sheets

FRICTION STIR WELDER AND METHOD FOR FRICTION STIR WELDING

CROSS-REFERENCE TO RELATED APPLICATION

This application claims the foreign priority benefit under 35 U.S.C. §119 of Japanese Patent Application No. 2006-063836 filed on Mar. 9, 2006, the disclosure of which is incorporated herein by reference.

BACKGROUND OF THE INVENTION

1. Field of the Invention

The present invention relates to a friction stir welder and a method for friction stir welding.

2. Description of the Related Art

Recently, a friction stir welding scheme has frequently been introduced to various cases, as a welding technique that reduces distortion or deformation of welded material pieces due to thermal influences caused by welding. For example, as disclosed in U.S. Pat. No. 6,051,325, a friction stir welding is performed in such a manner that a pair of works (material pieces to be welded) that are mounted and stacked one on the other on a stage and a rotary tool rotating at high speed is pressed into the works. When a pin attached at a tip end of the rotary tool reaches the upper work, a portion of the upper work becomes heated and softened due to a friction with the pin of the rotary tool. As the portion of the upper work becomes softened, the pin of the tool is gradually inserted into and then through the upper work, and eventually reaches the lower work, when an interfacing portion between the works and the pin of the rotary tool as well as in the vicinity thereof is further heated and plastic flow occurs, whereby the upper and lower works are welded.

However, in such a prior art as mentioned above, when the works are welded at edge portions thereof, a defective joint may occur if a distance between the rotary tool and end faces of the works are too small. Specifically, as shown in FIG. 5, when a rotary tool 100 welds the works 110 at the edge portions 111 thereof, a softened part of the works that is stirred and soften may be squeezed out between the edge portions 111 of the works 110 due to an inner pressure that occurs during welding the works 110. This may cause a deformation such as a leaked overlay 112 (burr) between the works 110, 110, due to which the edge portion 111 of the upper work 110 warps, so that a gap 113 is generated between the edge portions 111, 111, resulting in a defective joint. Consequently, there have been difficulties in welding the works 110 at the edge portions 111, 111 thereof in a proper quality.

Therefore, it would be desirable to provide a friction stir welder and a method for friction stir welding for welding works at edge portions thereof in a high quality.

SUMMARY OF THE INVENTION

One aspect of the present invention provides a friction stir welder that includes a stage on which at least two material pieces to be welded are mounted and stacked; a pressing member that covers and presses end faces of the material pieces to be welded that are mounted and stacked on the stage; and a rotary tool that is inserted into the stacked material pieces to be welded while rotating, so that a plastic flow is generated at an interfacing portion as well as in a vicinity thereof between the rotary tool and the material pieces to be welded, thereby to joint the material pieces to be welded to each other.

Another aspect of the present invention provides a friction stir welding method for welding at least two material pieces to be welded that are mounted and stacked on a stage. The friction stir welding method includes a step of pressing the stacked material pieces to be welded by a pressing member that covers and presses end faces of the stacked material pieces to be welded; a step of inserting a rotary tool into the stacked material pieces to be welded while rotating the rotary tool; and a step of welding the material pieces to be welded each other by generating a plastic flow of the material pieces to be welded at an interfacing portion as well as in a vicinity thereof between the rotary tool and the material pieces to be welded.

Other features and advantages of the present invention will become more apparent from the following detailed description of the invention when taken in conjunction with the accompanying exemplary drawings.

BRIEF DESCRIPTION OF THE DRAWINGS

FIG. 2 is a front view of the friction stir welder according to the embodiment of the present invention.

DETAILED DESCRIPTION OF THE PREFERRED EMBODIMENTS

Figure 1:
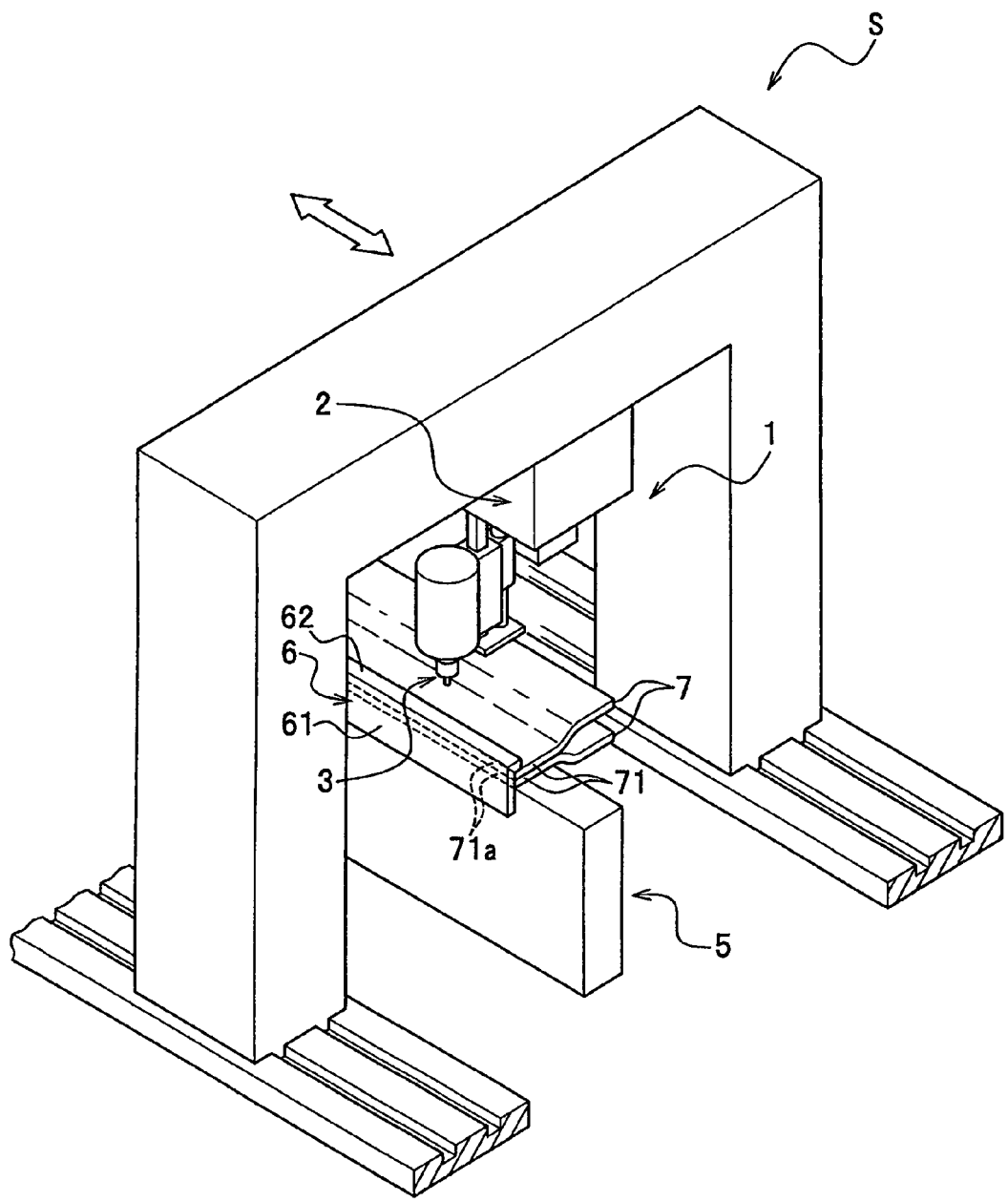
FIG. 1 is a perspective view of a friction stir welder and a slider according to an embodiment of the present invention.

With reference to attached drawings, descriptions of an embodiment of the present invention will be provided hereinafter. FIG. 1 is a perspective view of a friction stir welder 1 and a slider S according to the present embodiment of the present invention.

As shown in FIG. 1, the friction stir welder 1 is used in cooperation with a gate-type slider S. The slider S slidably moves relative to a stage 5 (described later), in a longitudinal direction along works 7, 7 (also referred to as "material pieces to be welded").

<Friction Stir Welder>

Figure 2A:
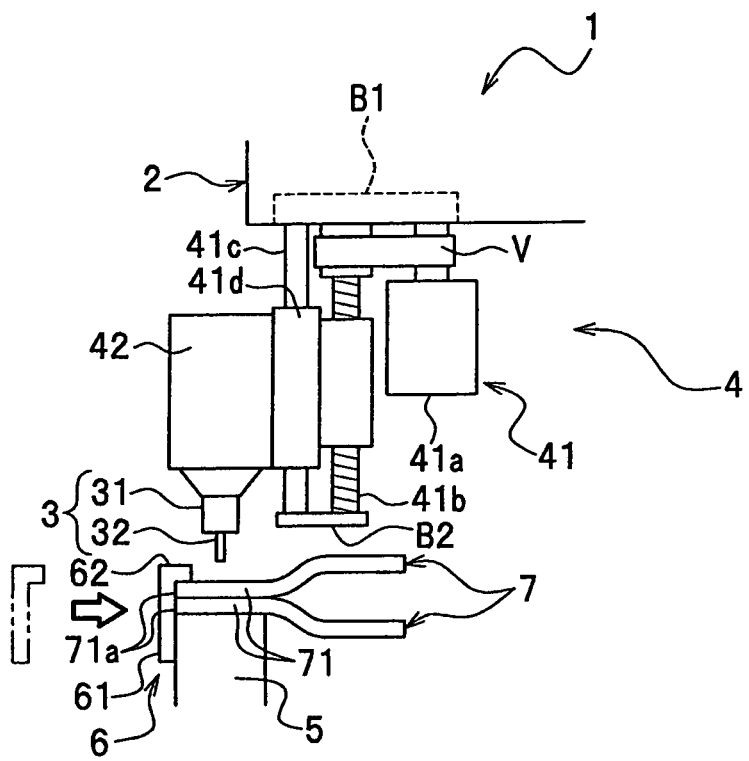
FIG. 2A shows a state of the friction stir welder before a welding operation.
Figure 2B:
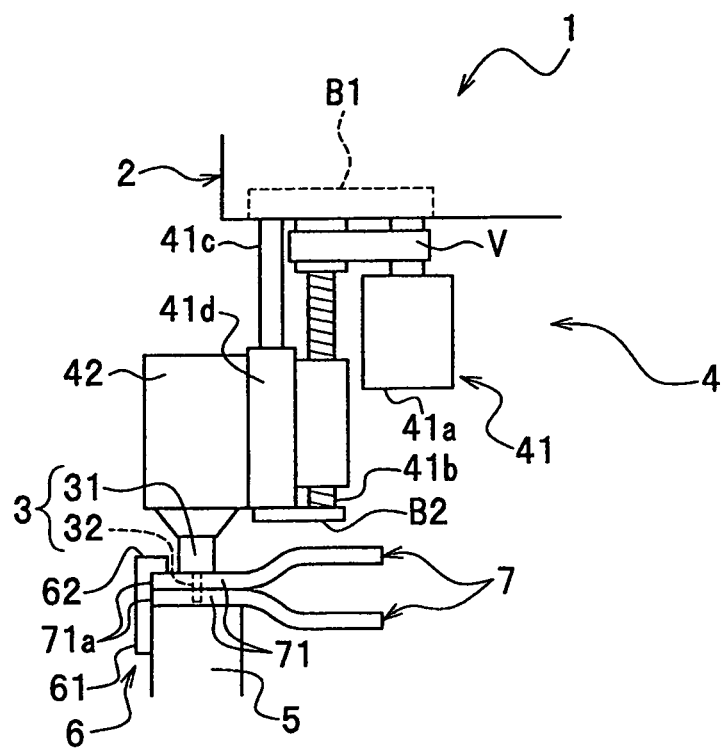
FIG. 2B shows a state of the friction stir welder during the welding operation.

FIGS. 2A, 2B are front views of the friction stir welder 1 according to the present embodiment. FIG. 2A shows a state of the friction stir welder 1 before a welding operation, and FIG. 2B shows a state of the friction stir welder 1 during the welding operation. In the descriptions of the present embodiment, a vertical direction is defined based on a state in which the tip end of the rotary tool is set downward, as shown in FIGS. 2A, 2B.

As shown in FIG. 2A, the friction stir welder 1 includes a holder 2, a rotary tool 3 which is attached to the holder 2, a driving part 4 for driving the rotary tool 3, the stage 5 on which the works 7, 7 are mounted and stacked, and a pressing member 6 for pressing the works 7, 7.

The holder 2 is attached to the slider S (see FIG. 1), and slidably moves together with the slider S. The holder 2 is provided on a lower face thereof with the rotary tool 3 and the driving part 4.

The rotary tool 3 serves to weld the works 7, 7, and includes a cylindrical body 31 and a probe 32 co-axially projecting from an end of the body 31. The body 31 is integrally formed with the driving part 4. The probe 32 is a pin-like member having a diameter smaller than that of the body 31. An outer circumference of the probe 32 may be threaded (not shown in the drawing). The body 31 and the probe 32 are formed of materials, which are harder than that of the works 7, 7, and have heat-resistance against frictional heat that occurs during the welding operation.

The driving part 4 is provided on the lower face of the holder 2, and includes a pressure inducing part 41 for moving the rotary tool 3 toward or away from the works 7, 7 and a rotary driving part 42 for rotating the rotary tool 3.

The pressure inducing part 41 is attached to a mount bracket B1 fixed on the lower face of the holder 2, and includes a servo motor 41a, a ball screw 41b, a slide guide rail 41c and a slide table 41d.

The servo motor 41a transmits a torque via a driving belt V to the ball screw 41b. The ball screw 41b converts the torque into a linear force, which is transmitted to the slide table 41d. The slide guide rail 41c serves as a rail for guiding the slide table 41d, which is provided between the mount bracket B1 and a supporting member B2 in parallel to the ball screw 41b. The slide table 41d is supported via a nut (not shown in the drawing) threadedly engaging with the ball screw 41b, as well as is attached to the ball screw 41b and the slide guide rail 41c in such a manner that the slide table 41d spans therebetween. The slide table 41d is provided with the rotary tool 3 via the rotary driving part 42.

The pressure inducing part 41 drives the servo motor 41a so as to rotate the ball screw 41b. The rotation of the ball screw 41b is transmitted to the slide table 41d in a linear motion, so that the slide table 41d moves in one direction along the slide guide rail 41c. Note that the slide table 41d moves in the other direction by reversely rotating the ball screw 41b, whereby the rotary tool 3 moves toward or away from the works 7, 7.

The rotary driving part 42 may be constituted by a servo motor, and is attached to the slide table 41d. The rotation axis of the rotary driving part 42 is identical to that of the rotary tool 3, so that the rotary tool 3 rotates when the rotary driving part 42 drives.

The stage 5 is an approximately rectangular base which is fixed at a position surrounded by the gate-type slider S (see FIG. 1). Since the stage 5 supports a load applied by the rotary tool 3 when pressing the works 7, 7, the stage 5 may preferably be formed from a highly rigid material such as a high speed steel.

The pressing member 6 is formed in an approximately L shape in a cross section, constituted by a long rectangular base portion 61 and a pressing portion 62 formed at an longitudinal edge of the base portion 61 to be bended toward the edge portions 71, 71 of the works 7, 7(see FIG. 1). As shown a length of the base portion is significantly greater in a stacked direction of the material pieces than a length the pressing portion in a direction perpendicular to the stacked direction, while the base portion also engages a side portion of the stage at a level lower than the stage surface on which the material pieces are mounted and stacked, the side portion of the stage extending substantially parallel to and in a common plane with an engaging surface of the pressing member which fully covers and presses the end faces on one side of the material pieces along a full length of the material pieces on the one side.

A description will be given on the works 7, 7. The works 7, 7 are material pieces to be welded, each of which is made of aluminum alloy, for example. The works 7, 7 are mounted and stacked on the stage 5 in such a manner that edge portions 71, 71 of the works 7, 7 are stacked so that both end faces 71 a, 71 a thereof meet and form a flat face. After the edge portions 71, 71 are stacked in this manner, the base portion 61 of the pressing member 6 fully covers and firmly presses the end faces 71a, 71a of the edge portions 71, 71 on one side of the material pieces along a along a full length of the material pieces on the one side, and the pressing portion 62 of the pressing member 6 presses the edge portions 71, 71 in a stacked direction thereof.

<Operations of Friction Stir Welder>

Figure 3:
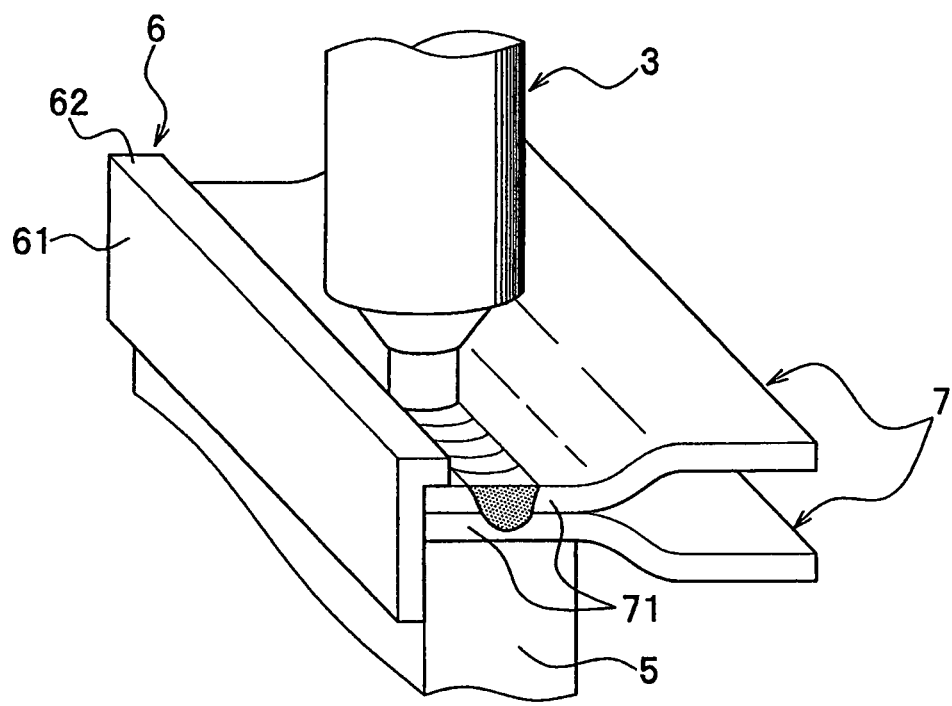
FIG. 3 is an enlarged perspective view of an essential part of the friction stir welder during the welding operation.

With reference to drawings, descriptions will be provided on operations of the friction stir welder 1 as well as friction stir welding methods performed by the friction stir welder 1. FIG. 3 is an enlarged perspective view of an essential part of the friction stir welder 1 during a welding operation. A description will be given on a case of welding the works 7, 7 along the edge portions 71, 71 thereof, as follows.

First, as shown in FIG. 2A, the works 7, 7 are mounted and stacked on the stage. The end faces 71a, 71a of the edge portions 71, 71 are fully covered and firmly pressed by the base portion 61 of the pressing member 6. At the same time, the edge portions 71, 71 are pressed by the pressing portion 62 of the pressing member 6 in the stacked direction of the works 7, 7 (pressing operation), and then the pressing member 6 is fixed to the stage 5.

While the rotary driving part 42 drives and rotates the rotary tool 3, the pressure inducing part 41 drives, whereby the rotary tool 3 rotates and descends, and then presses the works 7, 7 at the probe 32 thereof. As shown in FIG. 2B, the works 7, 7 get softened due to friction heat caused by rotations of the rotary tool 3. Thereby, the probe 32 of the tool 3 is gradually inserted into the edge portion of the upper work 7, and eventually, the probe 32 of the rotary tool 3 reaches a vicinity of a portion interfacing with the edge portion 71 of the lower work 7 (inserting operation).

As shown in FIG. 3, while the probe 32 of the rotary tool 3 (see FIG. 2) is inserted in the works 7, 7, the rotary tool 3 is moved by sliding the slider S (see FIG. 1).

Accordingly, the probe 32 of the rotary tool 3 moves while rotating, so that a plastic flow of the materials of the works 7, 7 occurs at an interfacing portion as well as in the vicinity thereof between the probe 32 and the edge portions 71, 71, and at an interfacing portion as well as in the vicinity thereof between the upper work 7 and the lower work 7, whereby the materials of the upper and the lower works 7, 7 are stirred and mixed, so that the works 7, 7 are welded along the edge portions 71, 71 thereof (welding operation).

The above mentioned operations of the friction stir welder 1 according to the present embodiment provides the following effects.

According to the present embodiment, even if the works 7, 7 are welded at the edge portions 71, 71 thereof (more specifically, at a portion apart from the end faces 71a, 71a by a distance of a radius of the body 31 of the rotary tool 3+a projecting length of the pressing portion 62 of the pressing member 6 from a face of the base portion 61 thereof, which contacts the end faces 71a, 71a of the works 7, 7), the base portion 61 of the pressing member 6 fully covers and firmly presses the end faces 71a, 71a of the works 7, 7, and thereby to prevent a leaked overlay built up between the edge portions 71, 71 of the works 7, 7. Accordingly, it is possible to prevent a defect such as a deformation due to such a leaked overlay between the edge portions 71, 71 of the works 7, 7, resulting in a high-quality welding.

In addition, according to the present embodiment, during the welding operation, the works 7, 7 are pressed by the pressing portion 62 of the pressing member 6 in the stacked direction, so that the edge portions 71, 71 of the works 7, 7 are in firm contact with each other as tight as possible. Accordingly, it is possible to make the gap between the edge portions 71, 71 negligible, resulting in a higher-quality welding.

Although the embodiment of the present invention has been described above, the present invention is not limited thereto, and may be applicable to variations of the present embodiment.

Figure 4:
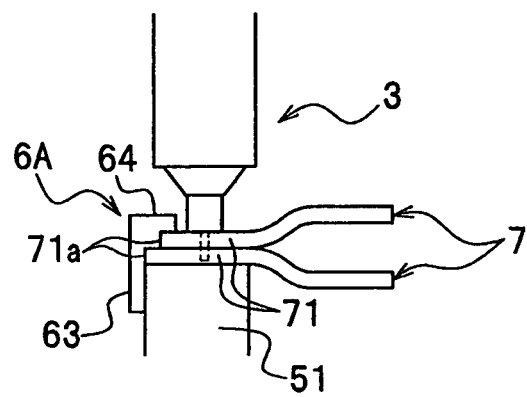
FIG. 4 is an enlarged front elevational view of an essential part of a friction stir welder according to a variation of the embodiment of the present invention.
Figure 5:
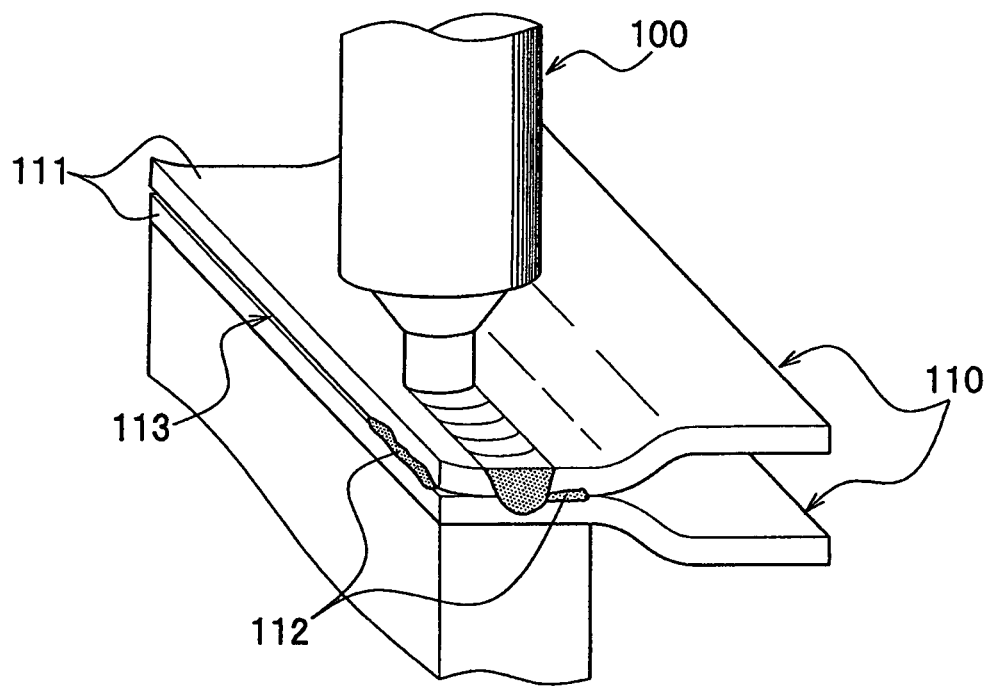
FIG. 5 is an enlarged perspective view of an essential part of a friction stir welder of a prior art.

For example, FIG. 4 is an enlarged front elevational view of an essential part of a friction stir welder according to a variation of the embodiment of the present invention.

In the above described embodiment, as shown in FIGS. 2A and 2B, the edge portions 71, 71 are welded in such a manner that the end faces 71a, 71a of the works 7, 7 meet and form a flat face. However, the works 7, 7 may be welded at the edge portions 71a, 71a thereof even in such a manner that one end face 71a does not meet the other end face 71a so as to from not a flat face but a step, as shown in FIG. 4. In this case, the base plate 63 and the pressing portion 64 of the pressing member 6A are formed into such a shape as to fit the step defined by both end faces 71a, 71a of the edge portions 71, 71. Accordingly, it is possible to prevent a leaked overlay between the edge portions 71, 71 during the welding operation as well as to make the gap therebetween as small as possible, also resulting in a higher-quality welding.

A shape of the pressing member 6 is not limited to a specific one, and the pressing member 6 may employ any shape fitting a shape defined by the end faces 71a, 71a, or the pressing portion 62 may be omitted by itself.

Although the above mentioned embodiment of the present invention employs a structure in which the holder 2 of the friction stir welder 1 is attached to the gate-type slider S, the present invention is not limited thereto, and may employ a structure in which the holder 2 is attached to a robot arm having plurality of joints or the like.

Although the above mentioned embodiment of the present invention employs a structure in which the rotary tool 3 is slidedly moved via the holder 2 by sliding the gate-type slider S, the present invention is not limited thereto, and may employ a structure in which the stage 5 is slidedly moved.

Although the above mentioned embodiment of the present invention employs a structure in which, after being mounted and stacked on the stage 5, the works 7, 7 are pressed by the pressing member 6, the present invention is not limited thereto, and may employ a structure in which the pressing member 6 is integrally formed with the stage 5 previously, and the works 7, 7 are set between the pressing portion 62 of the pressing member 6 and the stage 5, in which state, the works 7, 7 are fixed to the stage 5.

Although, in the above mentioned embodiment of the present invention, the descriptions have been provided on a case of welding the two work pieces 7, 7, the present invention is not limited thereto, and the friction stir welder 1 and the friction stir welding method according to the embodiment of the present invention may be applied to such a case of welding more than two work pieces.

Although in the above mentioned embodiment of the present invention, the material of the works 7, 7 is of the same kind such as aluminum alloy, the present invention is not limited thereto, and may apply the friction stir welder 1 according to the present embodiment to a case of welding works of the same kind other than aluminum alloy, or works of different kinds of materials.

As described above, in the friction stir welder and the friction stir welding method according to the present invention, the pressing member fully covers and firmly presses the end faces of the edge portions of the works, whereby preventing a leaked overlay between the edge portions of the works even when the works are welded at the edges portions thereof, resulting in a high-quality welding.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A friction stir welder comprising:
   a stage on which at least two material pieces to be welded are mounted and stacked, each of the material pieces having opposed broad face portions and a plurality of narrow end faces which surround the broad face portions, the broad face portions of the material pieces are engaged together and the end faces extend in a direction which is substantially perpendicular to a surface of the stage which supports the material pieces when the material pieces are mounted and stacked on the stage;
   a pressing member that is configured to fully cover the end faces on one side of the stacked material pieces along a full length of the material pieces on the one side and to press the covered end faces in a direction which is substantially parallel to the surface of the stage which supports the material pieces to prevent escape of the softened material from between the engaged end faces during a welding operation;
   a rotary tool that is inserted into the stacked material pieces to be welded while rotating such that the rotary tool extends substantially fully through the stacked material pieces in a stacked direction, so that a plastic flow of the material pieces to be welded is generated at an interfacing portion as well as in a vicinity thereof between the rotary tool and the material pieces to be welded, thereby to joint the material pieces to be welded to each other;
   a base portion that is configured to fully cover the covered end faces on one side of the material pieces to be welded that are mounted and stacked on the stage and to press the covered end faces of the material pieces in the direction which is substantially parallel to the surface of the stage which supports the material pieces; and
   a pressing portion that is configured to press one of the broad face portions of at least one of the stacked material pieces to be welded in a stacked direction thereof which is substantially perpendicular to the direction in which the base portion is configured to press the covered end faces,
   wherein the base and pressing portions of the pressing member are connected together in a substantially right-angle shape in cross section, and a length of the base portion in the stacked direction is greater than a length of the pressing portion which is substantially parallel to the surface of the stage.

2. A friction stir welder comprising:
   a stage on which at least two material pieces to be welded are mounted and stacked, each of the material pieces having opposed broad face portions and a plurality of narrow end faces which surround the broad face portions, the broad face portions of the material pieces are engaged together and the end faces extend in a direction which is substantially perpendicular to a surface of the stage which supports the material pieces when the material pieces are mounted and stacked on the stage;

a pressing member that is configured to fully cover the end faces on one side of the stacked material pieces along a full length of the material pieces on the one side and to press the covered end faces in a direction which is substantially parallel to the surface of the stage which supports the material pieces to prevent escape of the softened material from between the engaged end faces during a welding operation; and a rotary tool that is inserted into the stacked material pieces to be welded while rotating such that the rotary tool extends substantially fully through the stacked material pieces in a stacked direction, so that a plastic flow of the material pieces to be welded is generated at an interfacing portion as well as in a vicinity thereof between the rotary tool and the material pieces to be welded, thereby to joint the material pieces to be welded to each other, wherein a lower portion of the pressing member engages a side portion of the stage at a level lower than the stage surface on which the material pieces are to be mounted and stacked, the side portion of the stage extends substantially parallel to an engaging surface of the pressing member which is configured to fully cover and press the end faces on one side of the material pieces.

3. The friction stir welder according to claim 2, wherein the lower portion of the pressing member is fixed to the side portion of the stage.

4. A friction stir welding method for welding at least two material pieces to be welded that are mounted and stacked on a stage, each of the material pieces having opposed broad face portions and a plurality of narrow end faces which surround the broad face portions, the broad face portions of the material pieces are engaged together and the end faces extend in a direction which is substantially perpendicular to a surface of the stage which supports the material pieces when the material pieces are mounted and stacked on the stage, the method comprising:

a step of pressing the stacked material pieces by a pressing member that fully covers the end faces on one side of the material pieces along a full length of the material pieces on the one side and presses the covered end faces in a direction which is substantially parallel to the surface of the stage which supports the material pieces to prevent escape of the softened material from between the engaged end faces during a welding operation;

a step of inserting a rotary tool into the stacked material pieces to be welded while rotating the rotary tool such that the rotary tool extends substantially fully through the stacked material pieces in a stacked direction; and a step of welding the material pieces to each other by generating a plastic flow of the material pieces to be welded at an interfacing portion as well as in a vicinity thereof between the rotary tool and the material pieces to be welded.

5. The friction stir welding method according to claim 4, wherein, in the step of pressing the stacked material pieces by the pressing member that fully covers and presses the covered end faces on one side of the stacked material pieces, a base portion of the pressing member fully covers and presses the covered end faces on one side of the material pieces in the direction which is substantially parallel to the surface of the stage which supports the material pieces and a pressing portion of the pressing member presses one of the broad face portions of at least one of the stacked material pieces to be welded in a stacked direction thereof which is substantially perpendicular to the direction in which the base portion presses the end faces.

6. The friction stir welding method according to claim 5, wherein the base and pressing portions of the pressing member are connected together in a substantially right-angle shape in cross section, and a length of the base portion in the stacked direction is greater than a length of the pressing portion which is substantially parallel to the surface of the stage.

7. The friction stir welding method according to claim 4, wherein the pressing member engages the covered end faces on one side of material pieces which are mounted and stacked on the stage such that there is no gap between the engaged end faces and the pressing member.

8. The friction stir welding method according to claim 4, wherein a lower portion of the pressing member also engages a side portion of the stage at a level lower than the stage surface which supports the material pieces, the side portion of the stage extends substantially parallel to an engaging surface of the pressing member which engages the covered end faces on one side of the material pieces during said pressing, inserting and welding steps.

9. The friction stir welding method according to claim 8, wherein the lower portion of the pressing member is fixed to the side portion of the stage.

10. The friction stir welding method according to claim 4, wherein the rotary tool welds edge portions of the stacked workpieces which extend from the covered end faces of the material pieces.

11. The friction stir welding method according to claim 4, wherein a lap joint is formed between the stacked material pieces in the welding step.

12. The friction stir welding method according to claim 4, wherein the pressing member fully covers the end faces on only one side of the stacked material pieces along the full length of the material pieces on the one side of the stacked material pieces.

13. The friction stir welding method according to claim 4, wherein the one side of the stacked material pieces extends in a direction parallel to a welding direction during the welding step.

* * * * *